United States Patent [19]

Verano

[11] Patent Number: 4,825,978
[45] Date of Patent: May 2, 1989

[54] EMERGENCY BRAKING SYSTEM

[76] Inventor: Frank Verano, 504 Kevin Way, Placentia, Calif. 92670

[21] Appl. No.: 228,283

[22] Filed: Aug. 4, 1988

[51] Int. Cl.$^4$ ................................................. B60T 1/00
[52] U.S. Cl. ................................. 188/4 R; 152/225 R
[58] Field of Search ............... 188/4 R, 4 B, 2 R, 5–8, 188/10; 152/221–222, 225, 226–228, 251; 180/16, 15; 280/757

[56] References Cited

U.S. PATENT DOCUMENTS

| | | | |
|---|---|---|---|
| 898,082 | 9/1908 | Wolfe | 188/4 R |
| 1,261,557 | 4/1918 | Kreuser | 188/4 R |
| 1,283,788 | 11/1918 | Jenkins | 188/4 R |
| 1,290,400 | 1/1919 | Stevens | 188/4 R |
| 1,401,350 | 12/1921 | Monahan | 188/4 R |
| 1,482,159 | 1/1924 | Spung | 188/4 R |
| 2,068,541 | 1/1937 | Erdmann | 188/4 R |
| 2,344,148 | 3/1944 | Jackson | 188/4 R |
| 2,513,691 | 7/1950 | Tower | 188/4 R |
| 2,693,252 | 11/1954 | Bert | 188/4 R |
| 2,718,283 | 9/1955 | Ropp | 188/4 R |
| 2,730,196 | 1/1956 | Besoyan | 188/4 R X |
| 2,732,035 | 1/1956 | Besoyan | 188/4 R |
| 2,746,570 | 5/1956 | Stahmer | 188/4 R |
| 2,839,163 | 6/1958 | Kelly, Jr. et al. | 188/4 R |
| 2,868,333 | 1/1959 | Willison | 188/4 R |
| 2,960,191 | 11/1960 | Roberts | 188/4 R |
| 3,086,619 | 4/1963 | Grotz | 188/4 R |
| 3,303,907 | 2/1967 | Burtnett | 188/4 R |
| 3,321,046 | 5/1967 | Cooper | 188/4 R |
| 4,325,465 | 4/1982 | Lemon | 188/4 R |
| 4,354,580 | 10/1982 | Delasantos et al. | 188/4 R |

FOREIGN PATENT DOCUMENTS

| | | | |
|---|---|---|---|
| 328895 | 11/1920 | Fed. Rep. of Germany | 188/4 R |
| 646052 | 6/1937 | Fed. Rep. of Germany | 188/4 R |
| 1117938 | 1/1955 | France | 188/4 R |
| 505799 | 12/1954 | Italy | 188/4 R |
| 1125 | of 1913 | United Kingdom | 188/4 R |

Primary Examiner—Douglas C. Butler

[57] ABSTRACT

The invention relates to emergency braking of a tractor trailer or other automotive vehicle especially in a final panic situation prior to total loss of control. The present invention relates to a mechanical skid which is carried below the body of a tractor trailer just forward of the rear wheels. If the trailer wheels should lose traction or if the braking system should fail, the skid is dropped onto the roadway immediately in front of the rear wheels. The tractor's rear wheels roll onto the skid where they make contact with a vertical barrier which is part of the skid. The skid is then forced to slide along the road surface with the trailer's wheels on top of it until coming to a halt. The skid acts to provide a substantial increase in stopping power over that available through the brakes and tires alone. The bottom surface of the skid provides a much larger surface area in contact with the road than is provided by the tires. Additionally, the bottom surface of the skid can be made of extremely high friction materials and shapes since it is used only in emergencies. For instance, for stopping on ice, the bottom surface of the skid can be covered with spikes.

1 Claim, 3 Drawing Sheets

EMERGENCY BRAKING SYSTEM

BACKGROUND OF THE INVENTION

The invention relates to emergency braking of a tractor trailer or other automotive vehicle especially in a final panic situation prior to total loss of control. Trailor trucks are used to carry a great variety of goods on open roads. Control of the trailer while braking has always been a significant problem and continues to result in loss of life and property. The trailer is towed behind the tractor, being pivoted at the tractor at its forward end and rolling on a set of wheels at its rearward end. If traction between the trailer's wheels and the road surface is diminished or is lost, the trailer is subject to lateral skid forces. These forces can cause the trailer's wheels to slide sideways allowing the trailer to pendulum around the tractor. This is a frequent occurrence on wet or icy roads. When this occurs, there is very little that the driver can do to rectify the situation since further braking often accelerates the skid.

On long declines such as over mountain passes, frequent braking can cause brake "fading" or loss of braking power. This can result in a runaway truck. Mountain highways are often built with runaway truck stops. These consist of an additional lane on the side of the highway which is filled with sand. A truck, having lost its brakes, can pull over into this lane and coast to a stop safely because the tractor and the trailor both become bogged down in the soft sand. If a truck stopping lane is not available the only recourse open to the driver of a runaway is to try to gear-down and thus slow the truck by degrees until level ground is reached. Often it is not possible to engage the next lower gear of a truck having achieved a high rate of speed.

The patented prior art on the subject of the braking or slowing down of vehicles consists primarily of devices used in conjunction with the wheels of vehicles whereby friction is used to produce a drag force somewhere on the wheel itself. U.S. patent classification 188 2R has been searched and apparently is free of any sort of braking mechanism such as taught by the present invention. It is the applicants opinion that the present invention is new in this respect. The applicant believes that the invention is a new approach to the braking problems described above.

SUMMARY OF THE INVENTION

The present invention relates to a mechanical skid which is carried below the body of a tractor trailer just forward of the rear wheels. If the trailer wheels should loose traction or if the braking system should fail, the skid is dropped onto the roadway immediately in front of the rear wheels. The tractor's rear wheels roll onto the skid where they make contact with a vertical barrier which is part of the skid. The skid is then forced to slide along the road surface with the trailer's wheels on top of it until coming to a halt. The skid acts to provide a substantial stopping force. The bottom surface of the skid provides a much larger surface area in contact with the road then is provided by the tires alone. Additionally, the bottom surface of the skid can be made of extremely high friction materials and shapes since it is used only in emergencies. For instance, for stopping on ice, the bottom surface of the skid can be covered with spikes. An alternate use of the present invention relates to a float structure which is carried below the body of a tractor trailer just forward of the rear wheels. Typically the rear wheels of a tractor trailer carry the most weight per square inch of tire footprint, it therefore is often a problem that the trailer's wheels become bogged down on soft road surfaces. In this instance the float can be employed similarly to the skid described above to permit the tractor to pull the trailer off a soft road whereby the float provides buoyancy and a large surface area to prevent the rear end of the trailer from sinking. The skid or float is attached to the underside of the trailer by a means which causes the strut to fall downward to contact the roadway and which guides the skid under the forward rolling rear wheels. The trailer's wheels are then caused to roll onto the top surface of the skid. The skid is reusable and is therefore attached to the trailer by a means which provides a method of restoring the skid to its original location under the trailer.

Accordingly, the principal object of the present invention is to provide a novel skid and means for inserting it under the rear wheels of a tractor trailer; which is suitable for applying braking force to the trailer and which can be stored for reuse.

A further object is to provide a novel float which prevents the rear carriage from "digging in" when on soft grund, mud or snow, and means for inserting it under the rear wheels of a tractor trailer; which is suitable for applying flotation to the trailer and which can be stored for reuse.

Further objects and advantages of the invention will become apparent from a consideration of the drawings and ensuing description.

DRAWING REFERENCE NUMERALS

Figure 1:
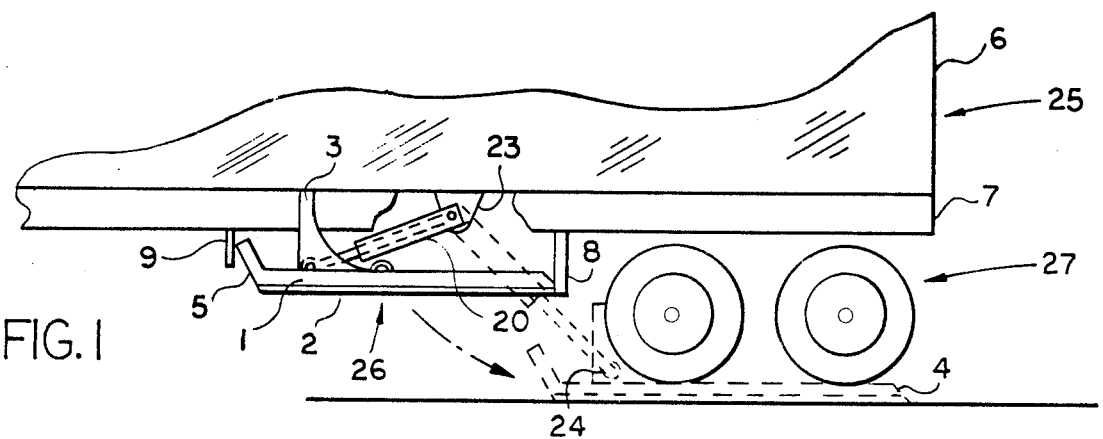
FIG. 1 is an elevation of part of the side of a tractor trailer showing the stored and in-use (dashed lines) positions of a first embodiment of the present invention being used as a skid or as a float.

1. Flat plate
2. Friction plate or high buoyancy plate
3. Tire stopping means
4. Sloped trailing edge 5. Raised leading edge
6. Body
7. Body support
8. Rear stabilizer
9. Forward stabilizer
10. Sprocket
11. Spool
12. Ratchet pin
13. Solenoid
14. Electrical conductors
15. Battery
16. Actuation switch
17. Cable
18. Hand Crank
19. Stop
20. Telescoping strut assembly
22. Pivot pin
23. First pivot support means
24. Second pivot support means
25. Tractor trailer
26. Skid or Float
27. Set of wheels
28. Winch assembly
29. Spool rotational axis
30. Cable attachment means
32. Outer strut member
34. Inner strut member
36. Ratchet pin rotational axis
50. Wishbone spring
52. Flexible leader flap
54. Holding arm
56. Actuation mechanism

DETAILED DESCRIPTION OF THE INVENTION

Figure 2:
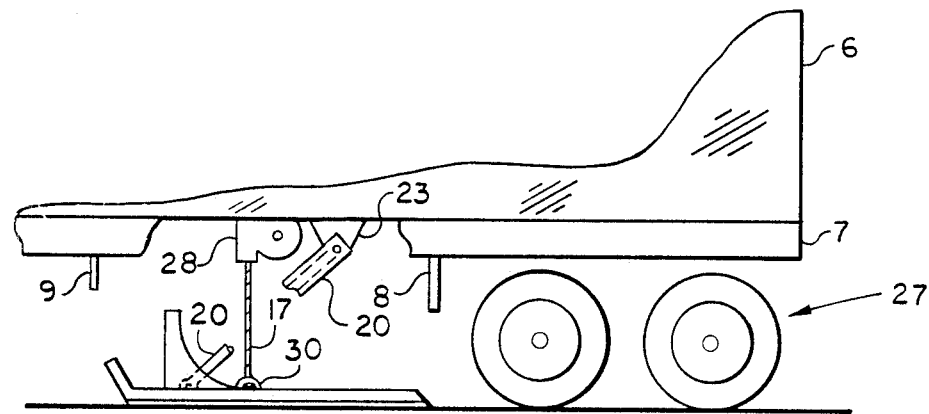
FIG. 2 is an elevation of part of the side of a tractor trailer showing a first embodiment of the present invention in position ready to be hoisted into the stored position.
Figure 3:
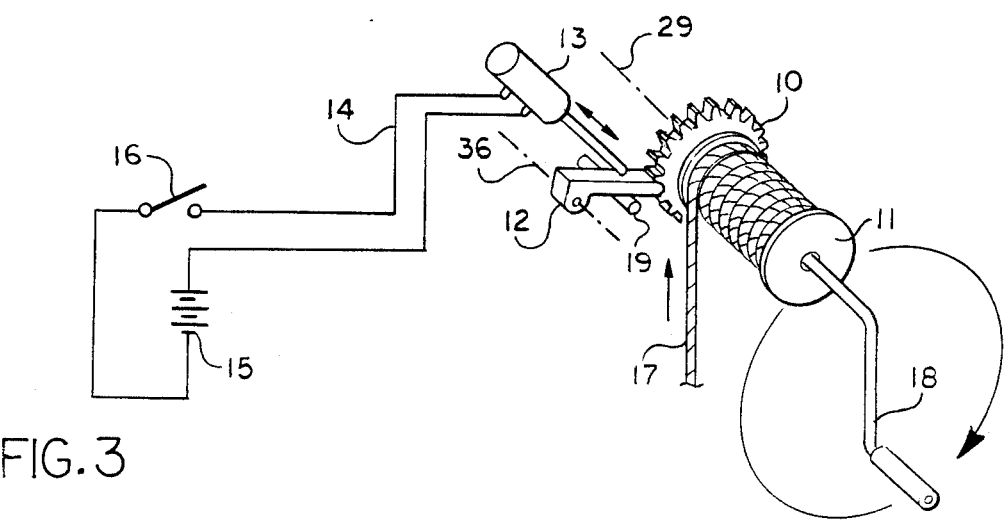
FIG. 3 is a schematic diagram of a first embodiment of the present invention showing the method for winding the cable onto the spool, halting the spool, and for remotely releasing the spool.
Figure 4:
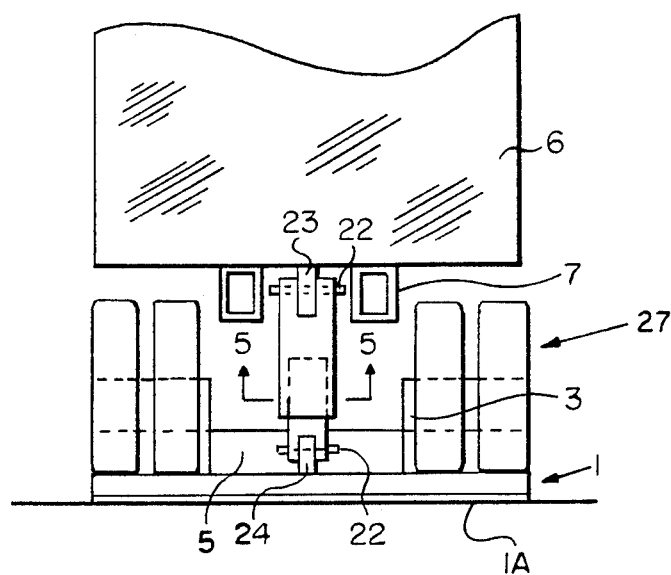
FIG. 4 is an elevation of part of the rear of the tractor trailer showing a first embodiment of the present invention in position under the wheels of the trailer.

With reference to FIGS. 1, 2 and 3, there is shown the various components of a first embodiment of the present invention. These comprise a skid 26 attached to a tractor trailer 25 by a telescoping strut assembly 20 and a cable 17.

Skid or float 26 is a weldment of steel plates. A flat plate 1 has a sloped trailing edge 4, and a raised leading edge 5. Attached to the top surface of flat plate 1 near the leading edge 5 is a tire stopping means 3 comprising one or more vertical steel plates, a cable attachment means 30 such as a steel eye and a pivot support means 24. Attached to the bottom surface of flat plate 1 is a friction plate 2 made of a high friction material such as rubber. Alternately friction plate 2 can be made of other high friction materials and can have high friction shapes such as spikes for a higher degree of stopping power. Alternately friction plate 2 can be made of a buoyant material such as wood to provide flotation.

The tractor trailer 25 may be any of a wide variety of styles including flat bed, tanker or boxcar type. General construction of the trailer is depicted herein by a body 6 set upon a body support 7 which is a structural frame member, and a set of wheels 27. Attached to the underside of body 6 is a winch assembly 28, an upper pivot support means 23 and two stabilizer plates 8 and 9.

Figure 5:
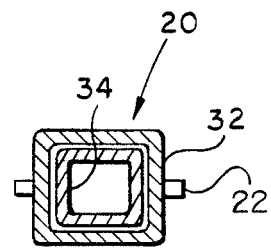
FIG. 5 is a cross-sectional view of the telescoping strut assembly of a first embodiment of the present invention.

Telescoping strut assembly 20 consists of two interleaved, square, hollow rods, outer strut member 32, and inner strut member 34, each having, at the opposite end from the other, a pivot hole which accepts pivot pin 22 for connection to pivot support means 23 and 24. FIG. 5 shows the construction and fit of outer strut member 32 and inner strut member 34 which comprise telescoping strut assembly 20.

FIG. 3 is a schematic diagram of the components of winch assembly 28. Cable 17 is wound onto spool 11 which revolves about rotational axis 29. The loose end of cable 17 is attached to cable attachment means 30. Sprocket 10 is fixed at one end of spool 11 and makes contact with ratchet pin 12. Ratchet pin 12 revolves about rotational axis 36 and normally rests upon stop 19. Solenoid 13 is attached to ratchet pin 12 and is electrically interconnected by wires 14 to battery 15 and switch 16, which are external to winch assembly 28. Switch 16 is located within easy reach of the tractor operator, preferably within the drivers cab.

Figure 6:
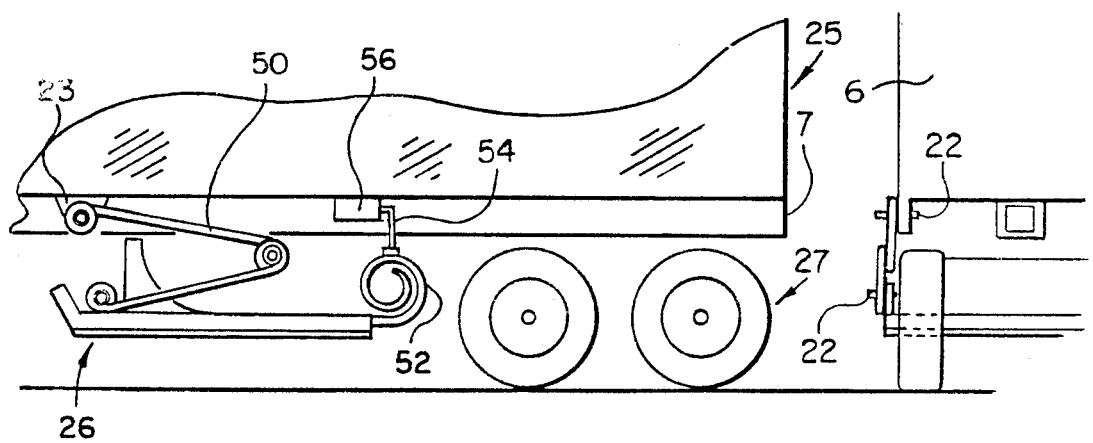
FIG. 6 is an elevation of part of the side and rear of a tractor trailer showing the stored position of a second embodiment of the present invention being used as a skid or as a float.
Figure 7:
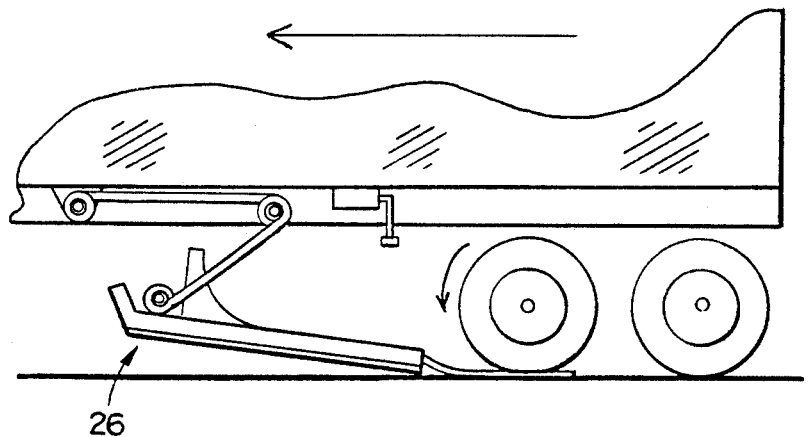
FIG. 7 is an elevation of part of the side of a tractor trailer showing a second embodiment of the present invention being automatically dispatched.
Figure 8:
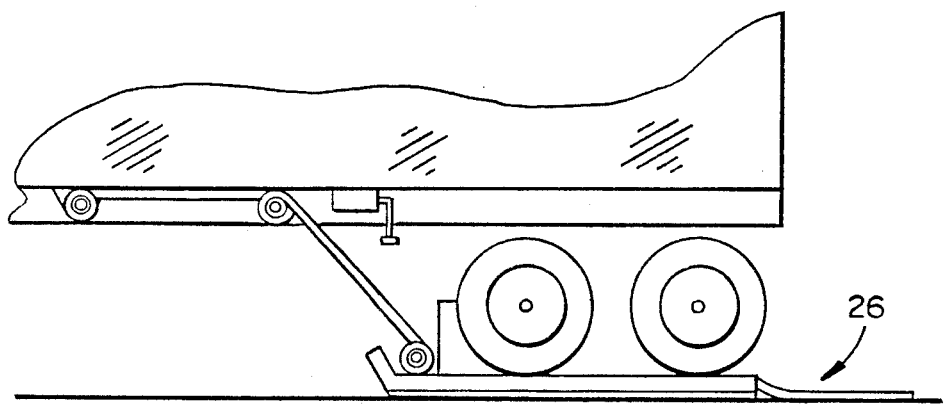
FIG. 8 is an elevation of part of the side of a tractor trailer showing a second embodiment of the present invention in its in-use position.

With reference to FIGS. 6, 7 and 8, there is shown the various components of a second embodiment of the present invention. Skid or float 26 is held in approximately the same position and orientation as described above except that it is held in the stored position by two wishbone shaped springs 50, one mounted on each side of skid 26 and attached also to body 6. The trailing edge of skid 26 has attached to it flexible leader flap 52 which is rolled onto the top of skid 26. Flap 52 is held in place by holding arm 54 connected to actuation mechanism 56.

OPERATION OF THE INVENTION

In an emergency whereby traction between set of wheels 27 and the roadway has been lost or brake failure has occurred, the driver closes switch 16. Battery 15 thereupon energizes solenoid 13 which lifts ratchet pin 12 allowing spool 11 to rotate freely. The weight of skid 26 causes spool 11 to unwind cable 17 allowing skid 26 to fall to the road's surface. The forward motion of trailer 25 forces set of wheels 27 to roll onto skid 26 and contact tire stopping means 3. Telescoping strut assembly 20 freely opens to allow skid 26 to fall but prevents skid 26 from moving sideways or rotating so that skid 26 remains in the path of set of wheels 27. Skid 26 acts to produce a large braking force against the roadway bringing the trailer 25 to a halt. Alternately, as a float, the same deployment mechanism is used as described above and the present invention acts to provide flotation to the rear wheels of a trailer when required on soft surfaces such as mud or snow. The invention acts to lighten the pulling force required by the tractor in order to haul the trailer out of or through deep mud or snow or other soft roadway. Raised leading edge 5 is tall enough to enable float 26 to climb over impediments such as built-up snow or mud and flat plate 1 then acts much like a surfboard to allow set of wheels 27 to slide upward and over impediments and to ride upon the surface of a soft roadway. Buoyancy plate 2, being of a light material such as wood enables the invention to ride on top of a soft road surface rather than sink into it and thus reduces the drag transmitted to the tractor.

To reset skid 26 to its original position, trailer 25 is backed off skid 26 and positioned such that winch assembly 28 is directly over cable attachment means 30. With switch 16 open, ratchet pin 12 rests against stop 19. Hand crank 18 is used to turn spool 11 such that cable 17 is rewound onto spool 11. When turning spool 11 each tooth of sprocket 10 pushes ratchet pin 12 upward. Ratchet pin 12 is able to pivot about rotational axis 36 against unenergized solenoid 13. After each tooth passes, ratchet pin 12 falls back against stop 19.

Skid 26 is lifted vertically into contact with the bottom surface of trailer 25 and between stabilizers 8 and 9 which act to prevent skid 26 from swaying forward or rearward while in the storage position.

The second embodiment is actuated by an electrical scheme identical to that described above except that the end result is the release of flap 52 which unrolls against set of wheels 27. Flap 52 is then dragged down by wheel turning action until it is caught between wheels 27 and the roadway. Wheels 27 then ride over flap 52 and onto skid or float 26. As trailer 25 moves over skid 26 spring 50 opens fully. To retract skid 26 trailer 25 is backed off skid 26 and flap 52 until spring 50 lifts skid 26 back into the storage position. Flap 52 is then manually rolled up and connected to holding arm 54.

It is to be understood that while there have been shown and described a first and a second preferred embodiment of the present invention, the invention may be embodied otherwise than is herein specifically illustrated or described and that in such embodiments certain changes in the details of construction, or in the form and arrangement of the parts, may be made without departing from the underlying idea or principles of this invention within the scope of the appended claims. Accordingly, the scope of the invention should be determined not by the embodiment illustrated, but by the appended claims and their legal equivalents.

Having thus described my invention what I claim as new, useful and non-obvious and, accordingly secure by Letters Patent of the United States is:

1. In a tractor trailer having a body supported on a set of wheels, the improvement of an emergency braking system comprising:
    (a) a pair of first pivot support means, mounted on opposite sides of said body at a position forward of said set of wheels;
    (b) a skid having a horizontal flat plate, said plate's width and length dimensions being approximately equal to the width and length dimensions of said set of wheels and said plate having a raised leading edge and having fixed to the upper surface of said plate:
        (i) a pair of second pivot support means, mounted on opposite sides of said plate near said leading edge
        (ii) a tire stopping means comprising one or more vertical plates
    (c) a roll of flexible material said roll's width being approximately equal to said plate's width, and one end of said roll being attached to the trailing edge of said plate and said roll being rolled above and to the rear of said plate's trailing edge above the roadway and forward of said set of wheels;
    (d) a pair of wishbone shaped springs having pivot attachment means at ends of arms of said springs and having pivot pins for mounting and having sufficient spring force to lift said skid;
    (e) a holding arm releasably connecting said roll with said body;
    whereby one wishbone shaped spring is pivotally connected between said first and said second pivot attachment means on each side of said trailer thereby holding said skid above said roadway and said holding arm is connected between said roll and said body thereby preventing said roll from unwinding and said holding arm therein holding said roll above said roadway and just forward of said wheels until in an emergency situation calling for braking said holding arm is remotely released allowing said roll to unwind in front of said wheels and causing said roll to be caught under said wheels and thereby causing said skid to roll over said roll and onto said skid, there being stopped by said tire stopping means and thus forming a braking means to said tractor trailer and upon backing said trailer off said skid, said wishbone shaped springs lift said skid into a storage position under said trailer.

* * * * *